United States Patent [19]

Beck

[11] 4,173,995

[45] Nov. 13, 1979

[54] RECIRCULATION BARRIER FOR A HEAT TRANSFER SYSTEM

[75] Inventor: Harold D. Beck, Downers Grove, Ill.

[73] Assignee: International Harvester Company, Chicago, Ill.

[21] Appl. No.: 838,193

[22] Filed: Sep. 30, 1977

Related U.S. Application Data

[63] Continuation-in-part of Ser. No. 603,490, Aug. 11, 1975, abandoned, which is a continuation-in-part of Ser. No. 552,090, Feb. 24, 1975, abandoned.

[51] Int. Cl.$^2$ .............................................. F28F 13/06
[52] U.S. Cl. .................... 165/51; 123/41.49; 165/122; 180/54 A; 415/210; 415/219 R; 415/DIG. 1
[58] Field of Search .................. 165/51, 122, 134; 123/41.48, 41.49; 180/54 A, 68 R; 415/210, 219 R, DIG. 1

[56] References Cited

U.S. PATENT DOCUMENTS

| | | | |
|---|---|---|---|
| 2,115,660 | 4/1938 | Yingling | 123/41.49 |
| 2,703,075 | 3/1955 | Sanders | 123/41.49 |
| 2,896,595 | 7/1959 | Guillo-Quevedo | 123/41.49 |
| 3,144,859 | 8/1964 | Walton | 123/41.49 |
| 3,858,644 | 1/1975 | Beck et al. | 123/41.49 |
| 3,872,916 | 3/1975 | Beck | 165/122 |

FOREIGN PATENT DOCUMENTS 295357  2/1929  United Kingdom .................. 123/41.49

*Primary Examiner*—Sheldon Jay Richter
*Attorney, Agent, or Firm*—Frederick J. Krubel; F. David AuBuchon

[57] ABSTRACT

A heat exchanger apparatus for a liquid-cooled internal combustion engine including a radiator axially spaced from the engine, an engine-driven, suction-type fan axially spaced intermediate the engine and the radiator for drawing cooling air axially through the radiator, fan shroud means shaped and positioned with respect to the radiator and blades of the fan whereby the air stream discharged by the fan is in a radial outward direction, and an air baffle positioned intermediate the fan and engine for mitigating air recirculation in the fan hub region; the fan shroud structure is formed to provide a generally cylindrical exit throat section (CF), a radial flat discharge section (RF), and a radial expander or diverging section (R), serving as a transition between the throat section and the discharge section, and wherein the impeller blades of the fan have a projected or effective axial width (AW); the various shroud structure sections are dimensioned with respect to such projected or effective axial width (AW) of the fan blades and the fan blades are positioned with respect to the shroud structure sections in the following manner: CF=AW/3, RF=AW/3, R=2AW/3, and the radial plane defining one axial limit of the projected or effective axial width (AW) of the fan blades substantially contains the radial discharge section (RF).

19 Claims, 7 Drawing Figures

RECIRCULATION BARRIER FOR A HEAT TRANSFER SYSTEM

The present application is a continuation-in-part of co-pending patent application Ser. No. 603,490, filed Aug. 11, 1975, now abandoned which, in turn, is a continuation-in-part of patent application Ser. No. 552,090, filed Feb. 24, 1975, now abandoned.

BACKGROUND OF THE INVENTION

This invention relates generally to a heat exchanger apparatus for a liquid-cooled internal combustion engine and, more particularly, to a new and improved heat exchanger apparatus which is effective to substantially reduce or eliminate recirculation of air at the fan impeller blade tips and at the fan hub regions so as to substantially improve the air velocity distribution over the air intake face of the heat exchanger or radiator. The present patent application, like patent application Ser. No. 552,090 and patent application Ser. No. 603,490, is related to patent application Ser. Nos. 348,436 and 348,437, both filed on Apr. 5, 1973 and issued, respectively, on Mar. 25, 1975 as U.S. Pat. No. 3,872,916 and on Jan. 7, 1975 as U.S. Pat. No. 3,858,644. Both of the aforementioned patents are assigned to the Assignee of the present patent application.

Most vehicles in general use today are propelled by internal combustion engines and such engines, as is well known, generate heat during the operation of the same. For the most part, the motor vehicle internal combustion engines employed commercially are of the liquid-cool type which entails the circulation, under pressure, of a coolant through the engine for absorbing heat. The correct operating temperature of the engine is maintained by subsequently passing, under pressure, the heated coolant received from the engine through a heat exchanger system or apparatus for dissipating heat from the coolant to the atmosphere and returning the coolant to the engine for recirculation in the engine. Generally, the heat exchange system employed includes a heat exchanger or radiator through which the heated coolant received from the engine is caused to flow. Simultaneously, air is caused to flow through the radiator which absorbs the heat from the heated coolant and carries it out into the atmosphere.

The cooling capacity of a heat exchange system of the type to which the present invention relates is depended upon many factors including the velocity and volume of the air caused to flow through the radiator, as well as the distribution of the air flow over the available heat exchange surface of the radiator. One type of air moving system employed for obtaining the necessary air flow through the radiator in order to maintain the desired operating temperature of the engine involves a fan of the axial flow, suction type. That is, the fan assembly is designed to suck or draw air from the atmosphere and cause the air stream to flow substantially axially through the radiator. Heretofore, in most vehicle installations the air stream, after passing through the radiator, was discharged back over the engine, which is usually spaced axially rearwardly of the fan and radiator.

It has been established that in the majority of conventional motor vehicle heat exchange systems, the axial flow, suction type fans utilized in such systems are extremely inefficient since, under optimum conditions, it is believed only about one-third of the length of each of the radially extending fan impeller blades is actually used for the movement of air axially through the heat exchanger or radiator. In fact, it has been found that the radially outer most one-third of each impeller blade length, the impeller blade tip section, actually pulls in air from an annular area radially rearwardly of the fan impeller blades and the fan shroud rather than forwardly thereof. Thus, the tip end of each fan blade is being used to merely recirculate air rather than to pull cooling air axially through the heat exchange core air passages. In a similar manner, the radial innermost one-third of each fan impeller blade at the hub region of the fan pulls in air from the area axially spaced rearwardly of the fan (instead of forwardly thereof) and thereafter discharges such air rearwardly of the fan. Consequently, as a result of such air recirculation phenomenon, only about the middle one-third of each fan impeller blade is actually effective in moving a cooling stream of air axially through the radiator. Approximately two-thirds of the energy necessary to drive the fan is thus wasted in the recirculation of air at the tip and hub regions of the fan.

SUMMARY OF THE INVENTION

The present invention contemplates the provision of a heat exchange apparatus or system for a motor vehicle engine wherein an axial flow, suction type fan, spaced axially intermediate the engine and the radiator, is employed for drawing air from the exterior of the vehicle forwardly of the radiator and expelling the air from the engine compartment in the form of an air stream having a major velocity component substantially normal or perpendicular to the direction of the airstream passing through the radiator by means of a unique fan shroud structure, and wherein a plate-like air barrier positioned in the vicinity of the fan hub region is employed. The shroud structure and air barrier are of particular designs and are positioned with respect to each other and the other components of the heat exchange apparatus in a unique and novel manner in order to mitigate the above-mentioned air recirculation deficiencies and other inherent shortcomings of prior art motor vehicle heat exchange systems utilizing conventially multi-bladed, axially flow, suction type cooling air fans. More particularly, the invention contemplates utilizing the fan shroud construction and the particular positioning of the fan impeller blades with respect to such fan shroud construction as shown and described in Applicant's aforementioned U.S. Pat. Nos. 3,872,916 and 3,858,644, both of which are assigned to the Assignee of the present invention. It has been discovered that by forming the fan shroud structures so as to provide a generally cylindrical exit throat section (CF), a radial flat discharge section (RF), and a radial expander or diverging section (R), serving as a transition between the throat section and the radial discharge section, and to dimension such fan shroud sections with respect to the projected or effective axial width (AW) of the fan impeller blade in a specific manner and to position the fan impeller blades with respect to such specifically dimensioned fan shroud sections in the below described manner, the performance of the engine cooling apparatus is improved substantially by lowering the operational noise level thereof, by reducing the power necessary for operating the cooling fan, and by substantially eliminating air recirculation at the tip area of the fan impeller blades. It is believed elimination of recirculation of air at the fan blade tip region results from the generation of the radial air discharge pattern brought about by the contoured fan structure of U.S. Pat. No. 3,872,916, referred to above. The various fan shroud structure sections are dimensioned with respect to the projected or effective axial width (AW) of the fan blades in the following manner: CF = AW/3, RF=AW/3, and RF =AW/3. The fan is also axially positioned with respect to the shroud structure such that the blades thereof are substantially in radial alignment with the aforementioned fan shroud structure sections. It has been determined that the radial discharge of air effected by the aforementioned contoured fan shroud construction in conjunction with the cooling fan placement or location with respect thereto is effective to eliminate or at least greatly hamper recirculation of air at the fan impeller blade tip region. Thus, utilization of the contoured fan shroud structure and the spatial relationship of the fan and such fan shroud structure as specifically pointed out in the aforementioned U.S. Pat. No. 3,872,916 increases the effectiveness of the fan impeller blades for moving air axially through the heat exchanger or radiator and improving the air velocity pressure distribution over the face of the heat exchanger.

It has been further discovered that the air flow distribution through the heat exchanger can be additionally improved and result in further improved heat transfer efficiency of the system by eliminating recirculation of the air in the fan hub region. Air recirculation in the hub region is avoided by positioning a plate or disk-like barrier intermediate the engine and the fan impeller blades.

It is, therefore, an object of the present invention to utilize the aforementioned fan shroud structure, to position the cooling fan with respect thereto as pointed out above, and to employ a plate-like air baffle spaced axially intermediate the engine and fan for preventing the drawing of air from the normal discharge side of the fan in order to insure all the air passing through the fan first passed through the core of the heat exchanger or radiator.

It is, accordingly, a primary objective of the present invention to provide a heat exchange system or apparatus for a motor vehicle engine wherein substantially the full length of each of the fan impeller blade is utilized to draw cooling air axially through the air cooling passage ways of the core of the radiator and wherein air recirculation losses at the fan impeller blade tip and hub regions are substantially eliminated.

An additional object of the invention is to provide means for improving the air velocity pressure distribution over the inlet face or area of the heat exchanger or radiator to thereby enhance the cooling efficiency of the heat exchange system.

A still further object of the present invention is to provide means for preventing the recirculation of air at the hub and fan blade tip regions of the cooling air fan so as to improve the air flow characteristics of the cooling air flowing through the heat exchanger.

Still another object is to provide a fan shroud structure and air barrier means for a motor vehicle engine cooling system or apparatus which, in combination, also functions as a safety guard for preventing accidental entry of hands and/or fingers into the space where the fan impeller blades are rotating during operation of the engine.

The foregoing and other important objects and desirable features inherent in and encompassed by the invention, together with many of the purposes and uses thereof, will become readily apparent from a reading of the ensuing description in conjunction with the next drawings, in which,

DESCRIPTION OF THE PREFERRED EMBODIMENT

Figure 1:
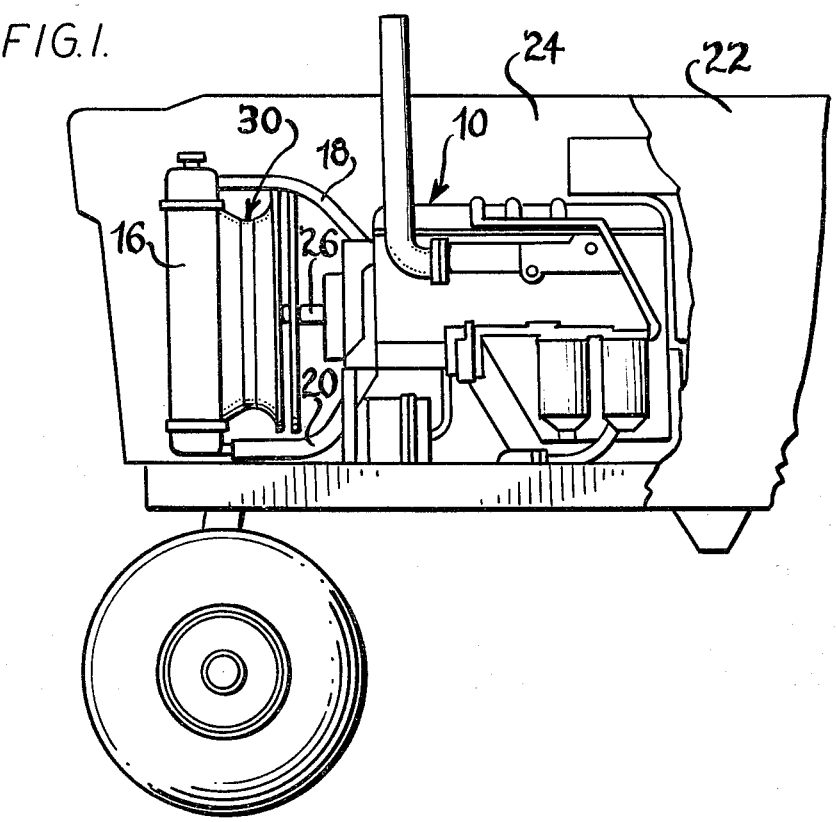
FIG. 1 is a side elevational, partially broken away, of a motor vehicle embodying the heat exchange apparatus of the present invention.

Referring to the drawings in detail, wherein like reference characters represent like elements throughout the various views, there is shown a conventional liquid-cool, heat-producing internal combustion engine 10 carried on lontitudinally extending frame support means 12 of a vehicle 14, partially shown in FIG. 1. As shown herein, the vehicle 14 is farm or industrial tractor. However, as will hereafter become more apparent, the heat exchange apparatus of the present invention can be applied to any type of vehicle employing any type of heat-generating engine, whether of the internal or external combustion type or to any other type of heat exchange system, whether portable or stationary, and whether used in conjunction with an engine or not. Mounted forwardly of the engine 10 is a liquid cooling radiator 16 which is employed to dissipate the engine generated heat. Water or engine coolant flows between the water jacket means (not shown) on the engine 10 and the radiator 16 through a pair of fluid communicating means or hoses 18 and 20. In this particular embodiment, sheet metal structure 22, partially shown in FIG. 1, substantially encloses the engine 10 thereby partially defining the engine compartments space 24.

Projecting forwardly of the forward end of the engine 10 is an engine-driven fan shaft 26, as shown in FIG. 1, whereby power is delivered to drive an axial flow, suction type fan 28. It is to be understood that the particular means for driving the fan 28 from the engine is not critical as far as the invention is concerned. Thus, in lieu of the direct drive transmission means illustrated conventional bell and pulley combinations could be employed. As employed here, the air-stream producing means is a rotatable, suction type, multi-bladed fan 28 which is axially positioned intermediate the radiator 16 and the engine 10. The fan 28 normally generates a flow of air during operation of the engine 10 and such air flow is directed by shroud means, designated generally by reference numeral 30. The shroud means 30 is connected to and extends axially rearwardly from the radiator 16. The particular shape of an entrance shroud section 32 of the shroud means 30 is depended upon the shape and design of the radiator 16 and the nature of the connection between the entrance or forward most edge of the entrance shroud section 32 of the shroud means 30 and the rearwardmost or air exit face 34 of the radiator 16. Suitable sealing means (not shown) are provided for sealing around the entire periphery of the aforementioned mating structures whereby the connection between the rearward most face of the radiator 16 and the shroud means 30 is relatively free of gaps or spaces which would allow the passage of air. In the preferred form of the invention, the entire rear face 34 of the radiator 16 is substantially sealed against the passage of air at the joint between the radiator 16 and the shroud means 30. The entrance shroud section 32, whether it be a tapered transition as shown or a box type, is formed so that it extends axially reardwardly and radially inwardly from the rearwardmost face 34 of the radiator 16 and its rearwardmost edge 36 has a substantially circular configuration.

Figure 2:
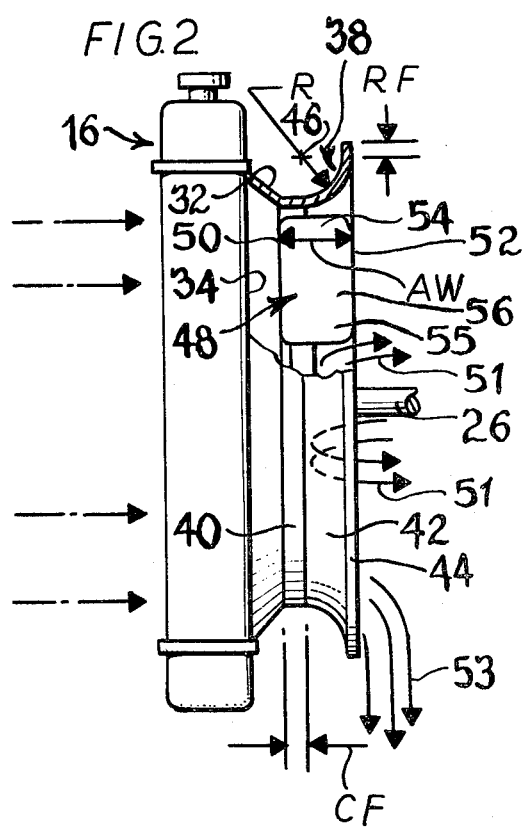
FIG. 2 is an enlarged, side elevational view, partly in vertical section, showing the spatial relationship of the air cooling fan and the contoured fan shroud, and the air flow pattern resulting from such relationship.
Figure 3:
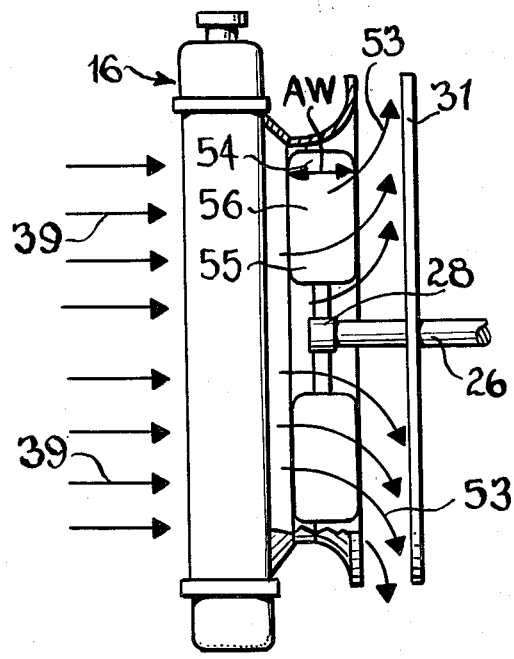
FIG. 3 is a view similar to FIG. 2 illustrating the improved heat exchange apparatus of the present invention including air barrier means, and the air flow pattern resulting from such improved heat exchange apparatus.

Referring to FIG. 2, the shroud means 30 also includes an exit shroud means 38 which, as shown, extends axially rearwardly and radially outwardly from the rearwardmost circular edge 36 of the entrance shroud section 32. The connection or joint between the entrance shroud section 32 and the exit shroud means 38 can be achieved by any suitable means, but it is to be understood that it is desirable that such connection or joint be relatively free of gaps or spaces which would allow the passage of air therethrough. Exit shroud means 38 includes a generally cylindrical, axially extending, throat section 40, an arcuate or curved portion or section 42, and a radially extending, generally flat flanged portion or section 44. For the most part, cylindrical throat section 40 where it joins the rearwardmost edge 36 of the entrance shroud section 32, defines the entrance edge of the exit shroud means 38. The arcuate or curved portion or section 42 extends radially outwardly and axially rearwardly from the opposite or rearwardmost edge of the cylindrical throat section 40. The arcuate or curved section 42 has a radius of curvature R which extends from an infinite number of reference points 46, all of which lie in a plane containing the rearwardmost edge of the cylindrical throat section 40 of the exit fan shroud means 38. The reference points 46 also lie on a circle having a diameter equal to the diameter of the cylindrical throat section 40 plus two times the radius of curvature R. As a result, the arcuate portion 42 has a generally bell-shaped appearance. In the preferred embodiment, arcuate of curved section 42 has a constant radius of curvature R. Radially extending, flat flange portion or section 44 defines the rearwardmost end of the exit fan shroud means 38 and generally lies in a radial plane perpendicular to the rotational axis of the cooling air fan 28. Overall, the entire exit fan shroud means 38 has a horn-like configuration, as best shown in FIGS. 2 and 3.

As previously stated, the cooling air fan 28 is of the axial flow, suction type and is positioned adjacent one side of the radiator 16. The fan 28 is operable to establish a flow of cooling air through the radiator 16 in an axial direction. The fan 28 includes a plurality of circumferentially spaced, radially extending impeller blades 48, as is well known in the art. Each of the fan impeller blades 48 can be divided radially into an end or tip region 54, a hub region 55, and a middle region 56 intermediate the tip and hub regions 54, 55, respectively. Each of the regions 54, 55, and 56 is approximate one-third of the total radial length of the fan impeller blade 48.

As pointed out here in before, one of the prime objects of the present invention is to substantially improve the heat transfer efficiency of heat exchange apparatus by increasing the effectiveness of the fan impeller blades for moving air axially through the heat exchanger or radiator and by improving the air velocity pressure distribution pattern over the face of the heat exchanger. The prime objective is achieved, in the main, by substantially eliminating air recirculation in both the fan hub region and the fan blade tip region. It was pointed out and explained in detail in the aforementioned U.S. Pat. No. 3,872,916 that the basic phenomenon which contributes to the realization of a generally smooth and relatively turbulent-free air stream flowing from the fan and the substantial elimination of air recirculation in the vicinity of the tip region of the fan impeller blade is believed to be the Coanda Effect generated by the passage of such fan-generated air stream over the surface of the particular fan shroud disclosed in the patent. As a result, the effectiveness of the fan impeller blades for moving air axially through the heat exchanger or radiator is dramatically improved. The air velocity pressure distribution pattern over the face of the heat exchanger is also improved considerably. The present invention is primarily concerned with means for further improving the overall performance and efficiency of the air cooling fan and, thus, improving the heat transfer efficiency of the heat exchange system. This is accomplished primarily by eliminating or substantially eliminating recirculation of air in the vicinity of the fan hub.

Achievement of the objects of the present invention is dependent upon many factors including the contour or surface of the fan shroud, the radial and axial positioning of the fan with respect to the fan shroud, and the dimensions of various contoured sections of the fan shroud with respect to the dimensions of the fan impeller blades, and, in particular, to the projected or effective axial width AW of the fan impeller blades. In order to clearly understand the invention and its operation, the definition of the projected or effected axial width AW of a fan impeller blade 48 as used herein will be the same as that used by many fan and heat exchange system design engineers and fan manufacturers and is that dimension measured along the rotational axis of the fan between a pair of spaced and parallel planes which are disposed substantially perpendicular to the rotational axis of the fan 28, each of which contains a point disposed, respectively, on the leading edge 50 and the trailing edge 52 of the impeller blade at the radially outermost one-third or blade tip region or portion 54 of the fan impeller blade 48.

Figure 4:
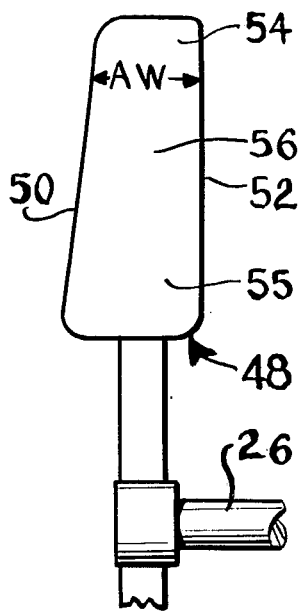
FIG. 4 is an enlarged, fragmentary view showing a cooling fan impeller blade wherein the trailing edge lies substantially in a plane perpendicular to the rotational axis of the fan and the leading edge is tapered or in a plane inclined with respect to the rotational axis of the fan.
Figure 5:
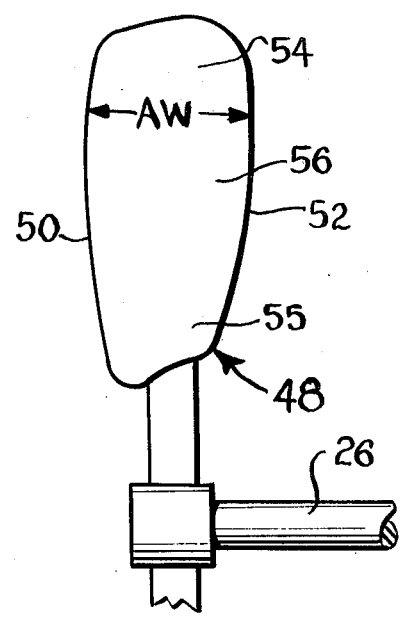
FIG. 5 is a view similar to FIG. 4 with the exception that the leading and trailing edges of the cooling fan impeller blade are curved.
Figure 6:
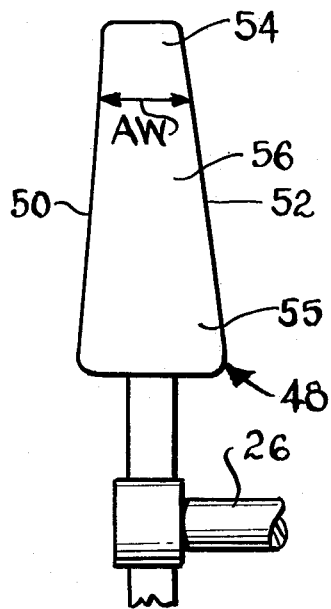
FIG. 6 is a view similar to FIG. 4 with the exception that both the leading and trailing edges of the fan impeller blade are tapered and lie in planes which converge radially outwardly of the fan impeller blade.
Figure 7:
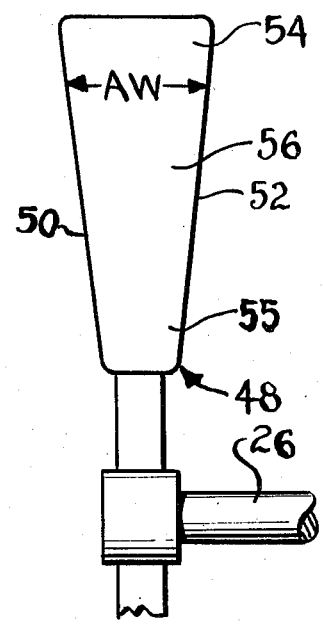
FIG. 7 is a view of a fan impeller blade which is similar to that shown in FIG. 6 with the exception that the taper of the leading and trailing edges is reversed from that shown in FIG. 6.

Inasmuch as the fan impeller blades 48 illustrated in FIGS. 2 and 3 are of the straight sided type, as distinguished from other common fan blade designs such as the types illustrated in FIGS. 4, 5, 6, and 7, substantially the entire leading edge 50 happens to lie in one of the two parallel planes between which the projected or effective axial width of the fan blade is measured and substantially the entire trailing edge 52 happens to be in the other one of the two parallel planes. In other words, the projected or effective axially AW, as defined above, of a straight sided fan impeller blade 48 is substantially the same as the axial width of the fan blade 48 whether measured at the hub region or portion 55, or at the intermediate middle region or portion 56, or at the radially outermost tip region or portion 54 since all of such axial width measurement values are substantially the same. However, by definition the projected or effective axial width AW of a taper sided fan blade 48 of the type illustrated in FIG. 6 of the drawings would always have to be smaller than the axial width of the fan blade as measured at the middle region 56 and usually considerably smaller than the axial width of the fan blade as measured at the hub region of the fan blade. In a fan blade design of the tapered side type, the leading edge 50 may be tapered while the trailing edge 52 of the blade is disposed in a plane perpendicular to the rotational axis of the fan, as illustrated in FIG. 4. Although not shown, alternatively, the trailing edge 52 of the blade 48 may be tapered and the leading edge 50 disposed in a plane normal to the rotational axis of the fan 28. In the fan blade design illustrated in FIG. 7, both the leading edge 50 and the trailing edge 52 of the blade are tapered since each of the edges lie substantially in a plane included at an angle with respect to the rotational axis which is greater than 90 degrees on one hand and less than 90 degrees on the other hand. However such taper is a reversal of the taper provided in the fan impeller blade 28 illustrated in FIG. 6. It is to be understood, however, that regardless of whether the fan blade design is of the straight sided type, as illustrated in FIGS. 2 and 3, taper sided type (one side, as illustrated in FIG. 4, or both sides, as shown in FIGS. 6 and 7) curve sided type, as illustrated in FIG. 5, or a hybrid version of such types, the projected or effective axial width AW of the fan impeller blade 48 is always measured or determined as pointed out hereinbefore. Preferably, as also pointed out above, the fan 28 is axially positioned so that one of the pair of parallel planes which are disposed substantially perpendicular to the rotational axis of the fan 28 and which are used to establish the axial limits of the projected or effective axial width AW of the impeller blades 48, substantially passes through the juncture of the fan shroud entrance section 32 and the exit shroud means 38 and the other plane of such pair of parallel planes substantially coincide with the plane containing the radially extending, flat flange portion or section 44 of the exit fan shroud means 38.

The fan 28 is, preferably, axially positioned with respect to the exit fan shroud means 38 so that the juncture of the fan shroud entrance section 32 and the exit shroud means 38 lies substantially in the plane perpendicular to the rotational axis of the fan 28 and contains the leading edges 50 of the fan impeller blades 48 (since the fan impeller blades illustrated in FIGS. 2 and 3 are of the straight sided type). Stated in another way, preferably, one of the two parallel planes defining the limits or axial length of the projected of effective axial width AW of the fan impeller bladess 48 passes through the juncture of the fan shroud entrance section 32 and the exit shroud means 38. It is also preferable to dimension and position the fan impeller blades 48 in such a manner that the plane containing the trailing edges 52 of the fan impeller blades 48, illustrated in FIGS. 2 and 3, also contains the rearwardmost radially extending, flat flange portion or section 44 of the exit shroud means 38.

Obviously, if the trailing edges 52 were anything but straight sided, as for example, the impeller blade designs shown in FIGS. 5, 6, and 7, the other one of the two parallel planes defining the limits of the projected or effective axial width AW would, preferably, contain rearwardmost radially extending flat flange section 44 of the exit shroud means 38.

Additionally, it is preferable to dimension the various sections of the exit shroud means 38, such as the cylindrical throat section 40, curve section or portion 42, and radial flat flange portion or section 44 in accordance with the disclosure of the aforementioned U.S. Pat. No. 3,872,916. Thus, for achieving optimum results, CF should have a value of approximately AW/3, R should be substantially 2 AW/3, and RF should have a value of approximately AW/3, where AW is a projected or effective axial width of the fan blades 48, as defined above, CF is the axial length of the cylindrical throat section 40, R is the radius of curvature of the arcuate or curve section 42 (R is also the distance from the reference points 46 to the transition surface), and RF is the radial length of the radial flange shroud portion or section 44. It should be understood, however, that these respective spatial relations and fan shroud section sizes can vary up to a distance equal to plus or minus 12 percent of the projected or effective axial width AW of the fan impeller blade 48 without departing from the spirit and scope of the invention. In other words, the juncture of the shroud entrance section 36 and the exit shroud means 38 can be axially spaced or offset a distance of 0.12 AW from the plane defining one axial limit of the axial width AW of the impeller blades 48 (or, in the case of the apparatus shown in FIG. 3, the plane containing the leading edges 50 of the fan impeller blades 48) without departing from the spirit and scope of the invention. Similarly, in the embodiment of the invention illustrated in FIG. 3, the plane containing the fan impeller blade trailing edges 52 (which plane is, in effect, the other one of the two parallel planes defining one axial limit of the projected or effective axial width AW of the fan impeller blades 48) may be axially spaced the same amount from the plane containing the rearwardmost radially extending portion of the exit shroud means 38. Furthermore, RF could have a value of AW/3 plus or minus the amount of 0.12 AW or R could have a value of 2 AW/3 plus or minus the amount of 0.12 AW, or RF could have a value of AW/3 plus or minus the amount of 0.12 AW without departing from the spirit and scope of the invention.

Considering the air flow pattern shown in FIG. 2, it is desirable to cut off or eliminate the air flow, figuratively shown as numeral 51, without the interruption of the general radially air flow pattern shown as reference numeral 53. As was previously stated, the drawing of air in the fan hub region from a point on the normal discharge side of the fan 28 rather than from entrance side thereof has a substantial detrimental effect on the efficiency of the fan. Thus, it is proposed to provide air recirculation barrier means 31 for at least substantially mitigating, if not fully eliminating, air recirculation in the hub region without disrupting the air flow pattern at the annular tip region of the fan 28.

Referring to FIG. 1, air recirculation barrier means 31 in the form of a flat disk and is shown positioned intermediate the fan 28 and the engine 10. The air recirculation barrier disk 31 has a generally circular outer configuration, the outer diameter of which is preferably about equal to that of the circle corresponding to the outermost periphery of the shroud radial flat flange section 44. The air recircirculation barrier disk 31 is provided with a central opening only slightly larger than the outer diameter of the fan drive shaft 23 for accommodating the fan drive shaft therethrough. The air recirculation barrier disk 31 may be supported by being fastened directly to the frame support means 12 by any suitable means, or by being secured to the forward part of the engine 10, or by being connected directly to the exit fan shroud means 38. Inasmuch as the means for supporting the air recirculation barrier disk 31 intermediate the air cooling fan 28 and the forwardmost end of the engine 10 forms no part of the present invention, it is to be understood that the air recirculation barrier disk 31, rather than being stationarily mounted with respect to the fan 28, could be supported directly on the drive shaft 28 so as to be rotatable in unison therewith departing from the spirit and scope of the invention.

It has been determined that optimum performance of the heat exchange assembly of the present invention is achieved when the air recirculation barrier disk 31 is positioned axially rearwardly of the plane defining one axial limit of the projected or effective axial width AW of the impeller blades 48, or, in the case of the straight sided blade design shown in FIG. 3, the plane containing the trailing edges 52 of the fan impeller blades 48, a distance corresponding to about 15 percent of the diameter of the circle made by the radially outermost edges of the fan impeller blade 48 when the fan 28 is in operation. Further, it is preferable to have the plane of the air recirculation barrier disk 31 substantially perpendicular to the rotational axis of the fan air 28 and, thus, substantially parallel with respect to the plane containing the radial flat flange section 44 of the exit shroud means 38. By dimensioning the air recirculation barrier disk 31 as pointed about above and axially spacing such sized air recirculation disk 31 as noted hereinbefore, recirculation of air at the fan hub region 55 is substantially mitigated without adversely effecting the generation of a radial discharge of air by the aforementioned contoured fan exit shroud construction and its relationship with the placement or location of the cooling air fan 28. The generation of such radial discharge of air results in the substantial elimination of recirculation of air at the fan blade tip region 54. Thus, with the above described heat exchanger apparatus, air recirculation losses at both the fan blade tip and hub regions, 54, 55, respectively, are substantially eliminated thereby enhancing the overall cooling and mechanical efficiency of the heat exchanger apparatus. The improved air flow pattern over substantially the entire front or intake face of the radiator 16 is illustrated graphically in FIG. 3 by arrows 39.

From the foregoing, it will also be appreciated that the air recirculation barrier disk 31 in conjunction with the contoured exit fan shroud means 38 served to provide an effective guard for preventing the accidental entry of hands and/or foreign objects into the space where the fan impeller blades are rotating during operation of the engine.

The embodiment of the invention chosen for the purposes of illustration and discription herein is that preferred for achieving the objects of the invention and developing the utility thereof in the most desirable manner, due regard being had to existing factors of the economy, simplicity of design and construction, and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined by the appended claims.

What is claimed is:

1. A heat exchange apparatus comprising:
   a heat exchange means having air intake and air discharge faces;
   a rotatable axial flow, suction-type fan having a plurality of circumferentially spaced impeller blades extending radially from a hub and positioned on one side of said heat exchange means adjacent said air discharge face for drawing air through said heat exchange means axially in a direction from said air intake face to said air discharge face, said air flow through said heat exchange means having a major velocity component parallel with respect to the rotational axis of the fan, each of said blades having an effective axial width AW measured axially along the rotational axis of the fan between a first plane and a second plane, said planes being axially spaced and parallel with respect to each other and disposed substantially normal to the rotational axis of the fan, said first and second planes extending radially, respectively, through a point on the leading edge of each of the blades at the tip portion thereof and through a point on the trailing edge of each of the blades at the tip portion thereof;
   shroud means having one axial end operatively connected to said heat exchange and encircling said fan, said shroud means being shaped and positioned with respect to said heat exchange means and the blades of said fan whereby the major velocity component of the air stream discharge by the fan is in a direction perpendicular to the direction of the major velocity component of the air stream entering the air intake face and flowing through said heat exchange means, said shroud means including a generally cylindrical, axially extending throat section, one axial end of said throat section substantially defining said one axial end of said shroud means operatively connected to said heat exchange means, said one axial end of said throat section lying substantially in a plane disposed substantially perpendicular to the rotational axis of said fan, one of said first and second planes being axially spaced from and on either axial side of said plane containing said one axial end of said throat section of said shroud means a distance of 12 percent of AW;
   and means axially positioned on the side of said fan opposite said heat exchange means for obstructing flow of air axially through the fan at the hub region thereof in an axial direction opposite the direction of said major velocity component of air flow through said heat exchange means, said means lying substantially in a plane spaced and substantially parallel with respect to a radial plane substantially defining a second axial end of said shroud means opposite said one axial end of said throat section substantially defining said one axial end of said shroud means.

2. A heat exchange apparatus as set forth in claim 1, wherein:
   said means positioned on the side of said fan opposite said heat exchange means for obstructing flow of air axially through the fan at the hub region thereof in an axial direction opposite the direction of said major velocity component of air flow through said heat exchange means includes a generally circular, substantially flat disk which is spaced from said radial plane substantially defining said second axial end of said shroud means a distance along the rotational axis of said fan about 15 percent of the diameter of the fan.

3. A heat exchange apparatus as set forth in claim 2, wherein:
said second axial end of said shroud means includes a generally annular portion, and rthe radially outermost periphery of said annular portion defined by a circle having a diameter substantially equal to the outermost diameter of said circular disk.

4. A heat exchange apparatus as set forth in claim 1, wherein:
said radial plane containing said one axial end of said throat section defining said one axial end of said shroud means is substantially coincident with said first plane partially defining the axial width AW of the fan blades.

5. A heat exchange apparatus as set forth in claim 4 wherein:
said radial plane substantially defining said second axial end of said shroud means opposite said one axial end of said throat section substantially defining said one axial end of said shroud means is substantially coincident with said second plane partially defining the axial width AW of said fan blades.

6. A heat exchange apparatus comprising:
a generally upright radiator having air intake and air discharge faces;
a rotatable axial flow, suction-type fan having a plurality of circumferentially spaced impeller blades extending radially from a hub and positioned on one side of said radiator adjacent said air discharge face for drawing air through said radiator axially in a direction from said air intake face to said air discharge face, said air flow through said radiator having a major velocity component parallel with respect to the rotational axis of the fan, each of said blades having an effective axial width AW measured axially along the rotational axis of the fan between a first plane and a second plane, said planes being axially spaced and parallel with respect to each other and disposed substantially normal to the rotational axis of the fan, said first and second planes extending radially, respectively, through a point on the leading edge of each of the blades at the tip portion thereof and through a point on the trailing edge of each of the blades at the tip portion thereof;
shroud means having one axial end operatively connected to said radiator and encircling said fan, said shroud means being shaped and positioned with respect to said radiator and the blades of said fan whereby the major velocity component of the air stream discharged by the fan is in a direction perpendicular to the direction of the major velocity component of the air stream entering the air intake face and flowing through said radiator, the axial end of said shroud means remote from said axial end operatively connected to said radiator being defined by an annular, radially outwardly extending flat portion lying substantially in a plane disposed perpendicular to the rotational axis of said fan, one of said first and second planes being axially spaced from and on either axial side of the plane containing said annular radially outwardly extending flat portion of said shroud means a distance of 12 percent or less of AW; and
means axially positioned on the side of said fan opposite said radiator for obstructing flow of air axially through the fan at the hub region thereof in an axial direction opposite the direction of said major velocity component of air flow through said radiator, said means lying substantially in a plane spaced and substantially parallel with respect to said plane in which said flat portion of said shroud means lies.

7. A heat exchange apparatus as set forth in claim 6, wherein:
said means positioned on the side of said fan opposite said radiator for obstructing flow of air axially through the fan at the hub region thereof in an axial direction opposite the direction of said major velocity component of air flow through said radiator includes a generally circular, substantially flat disk which is spaced from said plane in which said radially outwardly extending flat portion of said shroud means lies a distance along the rotational axis of said fan about 15 percent of the diameter of the fan.

8. A heat exchange apparatus as set forth in claim 7, wherein: the radially outermost periphery of said radial flat portion being defined by a circle having a diameter substantially the same as the diameter of said flat disk.

9. A heat exchange apparatus as set forth in claim 6, wherein:
one of said first and second planes is substantially coincident with said radial plane containing said radially outwardly extending flat portion of said shroud means.

10. A heat exchange apparatus as set forth in claim 6, wherein said second plane is substantially coincident with said radial plane containing said radially outwardly extending flat portion of said shroud means.

11. A heat exchange apparatus comprising:
a heat exchange means having front and rear faces;
a shroud means including a forward section having forwardmost edge means arranged to encircle said rear face of said heat exchange means, and a rear exit shroud means having forwardmost edge means joined to rearwardmost edge means of said forward section, said exit shroud means including, in successive sections, a generally cylindrical, axially extending throat section, an annular, radially and axially extending, curved section, and an annular, generally radially extending flat portion;
a rotatable axial flow, suction-type fan encircled by said rear exit shroud means having a plurality of circumferentially spaced impeller blades extending radially from a hub, each of said impeller blades having an effective axial width AW measured axially along the rotational axis of the fan between a first plane and a second plane, said planes being axially spaced and parallel with respect to each other and disposed substantially normal to the rotational axis of the fan, said first and second planes extending radially, respectively, through a point on the leading edge of each of the impeller blades at the tip region thereof and through a point on each of the trailing edges of the impeller blades also at the tip region thereof, said second plane being axially spaced from and on either axial side of a plane containing said annular, generally radially extending flat portion of said exit shroud means a distance of 12 percent or less of AW, and the following relationships exist: RF=AW/3 plus or minus 12 percent of AW, CF=AW/3 plus or minus 12 percent of AW, and R=2AW/3 plus or minus 12 percent of AW, where RF is the radial length of the radially extending flat portion, CF is the axial length of the cylindrical throat section, and R is the radius of curvature of the radial curved section; and air recirculation barrier means axially spaced rearwardly of said second plane a predetermined distance less than one half of the diameter of said fan for obstructing axial flow of air in a forward direction from the region axially rearwardly of said fan hub when said fan is rotated, said barrier means lying substantially in a plane spaced and substantially parallel with respect to said second plane.

12. A heat exchange apparatus as set forth in claim 11, wherein said second plane is substantially coincident with said radial plane containing said radially outwardly extending flat portion of said shroud means.

13. A heat exchange apparatus comprising:
the heat exchange means having front and rear faces;
a shroud means including a forward section having forwardmost edge means arranged to encircle said rear face of said heat exchange means, and a rear exit shroud means having forwardmost means joined to rearwardmost edge means of said forward section, said exit shroud means including, in successive sections, a generally cylindrical, axially extending throat section, an annular radially and axially extending, curved section, and an annular, generally radially extending flat portion;
a rotatable, axial flow, suction-type fan encircled by said rear exit shroud means having a plurality of circumferentially spaced impeller blades extending radially from a hub, each of said impeller blades having an effective axial width AW measured axially along the rotational axis of the fan between a first plane and a second plane, said planes being axially spaced and parallel with respect to each other and disposed substantially normal to the totational axis of the fan, said first and second planes extending radially, respectively, through a point on each of the leading edges of the impeller blades at the radial tip region thereof and through a point on each of the trailing edges of the impeller blades also at the radial tip region thereof, said second plane being axially spaced from and on either axial side of a plane containing said annular, generally radially extending flat portion of said exit shroud means a distance of 12 percent or less of AW, and the following relationships exist: RF=AW/3 plus or minus 12 percent of AW, CF=AW/3 plus or minus 12 percent of AW, and R=2AW/3 plus or minus 12 percent of AW where RF is the radial length of the radially extending flat portion, CF is the axial length of the cylindrical throat section, and R is the radius of curvature of the radial curved section; and air recirculation barrier means axially spaced rearwardly of said second plane a predetermined distance less than one half of the diameter of said fan for obstructing axial flow of air in a forward direction from the region axially rearwardly of said fan hub when said fan is rotated, said air recirculation barrier means being generally in a form of a flat and substantially imperforate disk, said disk lying substantially in a radial plane spaced and parallel with respect to said second plane.

14. A heat exchange apparatus as set forth in claim 13, wherein said second plane is substantially coincident with said radial plane containing said radially outwardly extending flat portion of said shroud means.

15. A heat exchange apparatus as set forth in claim 13, wherein:
said predetermined distance said air recirculation barrier means is axially spaced rearwardly of said second plane is about 15 percent of the diameter of said fan.

16. A heat exchange apparatus as set forth in claim 13, wherein:
said radial flat portion has its radially outermost periphery defined by a circle; and
said flat and substantially imperforate disk has its radially outermost periphery defined by a circle having substantially the same diameter as said circle defining the radially outermost periphery of said radial flat portion of said shroud means.

17. A heat exchange apparatus as set forth in claim 16, wherein:
said predetermined distance said air recirculation barrier means is axially spaced rearwardly of said second plane is about 15 percent of the diameter of said fan.

18. A heat exchange apparatus as set forth in claim 17, wherein:
said air recirculation barrier means is fixed with respect to said shroud means.

19. A heat exchange apparatus as set forth in claim 17, wherein:
said air recirculation barrier means is rotatable in unison with said fan blades.

* * * * *